United States Patent
Bond et al.

(10) Patent No.: US 12,532,804 B1
(45) Date of Patent: Jan. 27, 2026

(54) PROCESSOR CONTROL OVER THE STATE (POSITION, ATTITUDE OR DEGREE OF OPENNESS) OF DISCHARGE GATES FOR MOWERS

(71) Applicants: Gregory M. Bond, Ozark, MO (US); David A. Thomas, Ozark, MO (US); Matthew L. Thomas, Ozark, MO (US)

(72) Inventors: Gregory M. Bond, Ozark, MO (US); David A. Thomas, Ozark, MO (US); Matthew L. Thomas, Ozark, MO (US)

(*) Notice: Subject to any disclaimer, the term of this patent is extended or adjusted under 35 U.S.C. 154(b) by 157 days.

(21) Appl. No.: 18/588,561

(22) Filed: Feb. 27, 2024

Related U.S. Application Data

(60) Provisional application No. 63/487,022, filed on Feb. 27, 2023.

(51) Int. Cl.
*A01D 69/02* (2006.01)
*A01D 34/00* (2006.01)

(52) U.S. Cl.
CPC ........... *A01D 34/008* (2013.01); *A01D 69/02* (2013.01)

(58) Field of Classification Search
CPC .............................. A01D 34/008; A01D 69/02
See application file for complete search history.

(56) References Cited

U.S. PATENT DOCUMENTS

| | | | | |
|---|---|---|---|---|
| 6,857,256 | B2* | 2/2005 | Strange | A01D 43/0635 56/320.2 |
| 7,337,602 | B1* | 3/2008 | Butler | A01D 34/005 56/320.2 |
| 7,610,742 | B2* | 11/2009 | Imanishi | A01D 34/71 56/320.1 |
| 7,814,739 | B2 | 10/2010 | Uemura et al. | A01D 34/82 |
| 10,729,069 | B2 | 8/2020 | Condon | A01D 34/71 |
| 10,791,672 | B2 | 10/2020 | Berglund et al. | A01D 34/71 |
| 11,516,965 | B2 | 12/2022 | Strasser | A01D 42/005 |
| 11,910,746 | B2 | 2/2024 | Richards | A01D 34/71 |
| 2009/0031690 | A1* | 2/2009 | Kallevig | A01D 34/71 56/320.2 |
| 2019/0082592 | A1* | 3/2019 | Berglund | A01D 34/71 |
| 2021/0068342 | A1* | 3/2021 | Foster | A01D 34/71 |
| 2021/0084819 | A1* | 3/2021 | Strasser | A01D 42/005 |

* cited by examiner

*Primary Examiner* — Calvin Cheung
(74) *Attorney, Agent, or Firm* — Jonathan A. Bay

(57) ABSTRACT

Processor control over the state (position, attitude or degree of openness) of discharge gates for mowers provides an electronics package which senses or reckons the position of the discharge gate, and thereby provides users control thereover.

15 Claims, 21 Drawing Sheets

PROCESSOR CONTROL OVER THE STATE (POSITION, ATTITUDE OR DEGREE OF OPENNESS) OF DISCHARGE GATES FOR MOWERS

CROSS-REFERENCE TO RELATED APPLICATION(S)

This application claims the benefit of U.S. Provisional Application No. 63/487,022, filed Feb. 27, 2023. The foregoing patent disclosure(s) is(are) incorporated herein by this reference thereto.

BACKGROUND OF THE INVENTION

The invention relates to mowers and, more particularly, to control by means of electronic circuits, devices and processor for the "state" of a discharge gate for mowers. That is, "state" corresponds to position, or, degree of openess of the discharge gate (as in without limitation angle of attitude of a swinging flap-style discharge gate). Presumptively, the mower has a mowing deck with one or more outlets ('side' outlets) for discharge of mown material (the outlets can be in any direction feasible, sideways, rear, fore and anyway else).

The two most common discharge gate controls known to date are: 1) manual control with either a foot or hand control, and 2) electric control.

With manual control, the user has relatively good control of the position of the discharge gate: —ie., a manual bump on a cable-pushing and -pulling pedal or lever will open or close a partially-opened discharge gate to approximately the position ("state" or "attitude") as needed. One issue with a manual gate occurs as the gate wears and accumulates dirt on the moving parts requiring extended maintenance. Control cables can get pinched or jammed. Another issue is accuracy, as in when at an original time the user chooses to change from a first state to a second state, but then at a later time wanting to return to that first state, exactly.

With electric control known to date, a user is provided a switching option which has a zero option and one other option. And these produce three different outcomes: —
- the 'zero option' which corresponds to doing nothing (ie., power OFF),
- one toggle option in an indeterminate series of such toggle options corresponding to the discharge gate going from being open, as in straight up, to being closed, as in straight down, or vice versa,
- a succeeding another exercise of the one toggle option which results in the reverse of the above,
- a further succeeding exercise of the one toggle option corresponding to the reverse again, and so on.

This would be similar to an electric window on a car door where the two easily obtained possibilities are for the window being fully shut, or, fully wide open. Aiming for exact degrees of openess between those two states are difficult because the rate of travel of the window pane is relatively fast. Manually stopping the degree of openess (state) of the window pane at a pre-determined 'state' is rife with error.

In other words, relative to electric control known to date, fine control is lost due to the speed of the gate travel and lack of fineness with the control. Transitioning from fully open to fully closed can occur in less than a second. Stopping the gate precisely at mid-open is dependent on the reflexes of the operator. Fine control is nearly impossible.

What is needed is an improvement over the shortcomings of the prior art.

SUMMARY OF THE INVENTION

Various objects and aspects of the invention are characterized non-exclusively and without limitation by the following brief summaries.

It is an object of the invention to replace an open/off/closed switching control with a micro-controller gauging position sensor and an electronic package. The micro-controller in the electronic package reads the precise position of the control and then sends a signal to a servo motor to move the gate to the required position. As the servo motor and electronic package are both mounted in a motor mast, comprising a sturdy metal steel square tube weldable or otherwise fastenable/joinable to a prior art mower deck, there are very few moving parts. The speed of the gate transition can be as fast as the standard electric gate, or not, but fine control of gate position (or state) is still possible.

It is another object of the invention to provide upper and lower limit controls so that a user can adjust where the relative open state extremes and relatively closed state extremes be for such user's preferences.

It is an additional object of the invention to provide a "park" switch. A toggle that will bypass the control and raise the gate into a position out of harm's way if the need arises. When released, the gate will automatically return to the position indicated by the control. The park switch puts the discharge gate in a position (state or attitude) in a relatively safety position, as to be safe from being clipped off by scraping into a mailbox post or the like.

A number of additional features and objects will be apparent in connection with the following discussion of the preferred embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
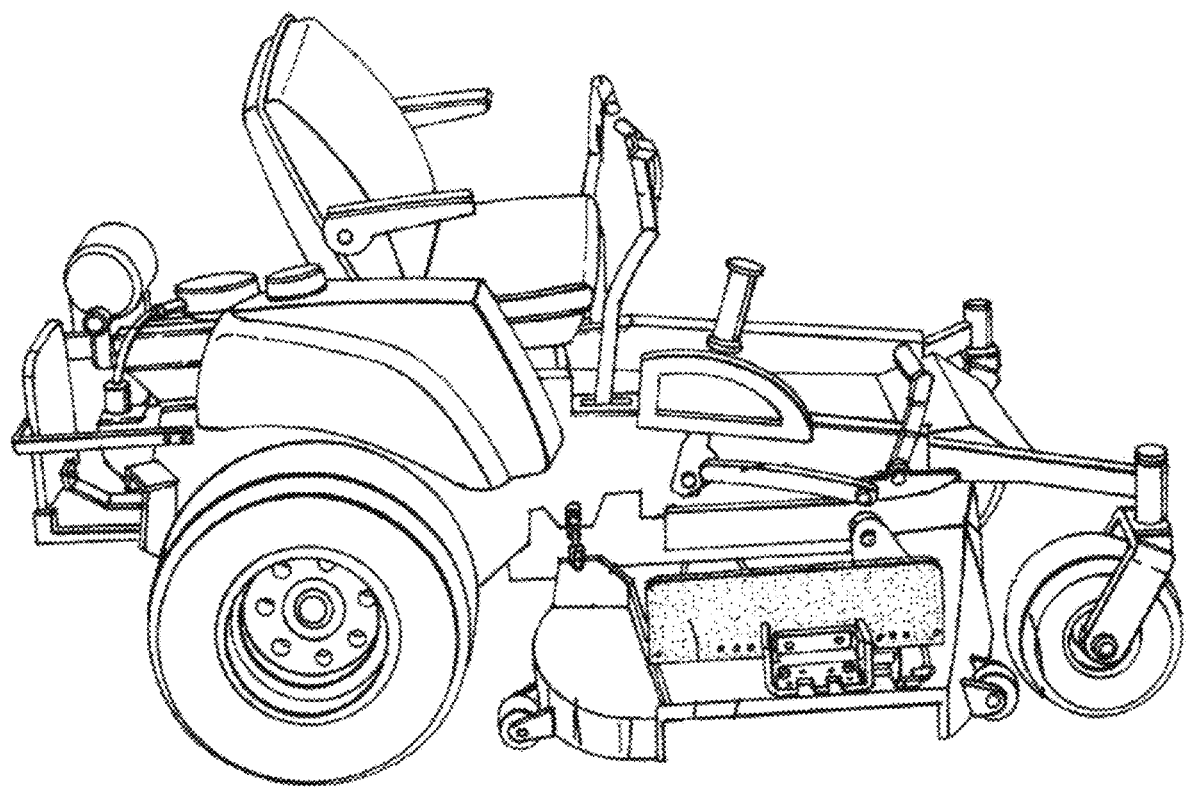
FIG. 1 is a perspective view of a riding lawn mower in accordance with the prior art provided and which is provided with a discharge gate also in accordance with the prior art for the side outlet of a mower deck (wherein this view is taken from U.S. Pat. No. 11,910,746—Richards)

FIG. 1 shows a perspective view of a riding lawn mower in accordance with the prior art, and provided with a discharge gate also in accordance with the prior art. The lawn mower comprises a mower deck which is formed with a side outlet for discharge of grass clippings, as long as not closed shut by a gate or the like.

Figure 2:
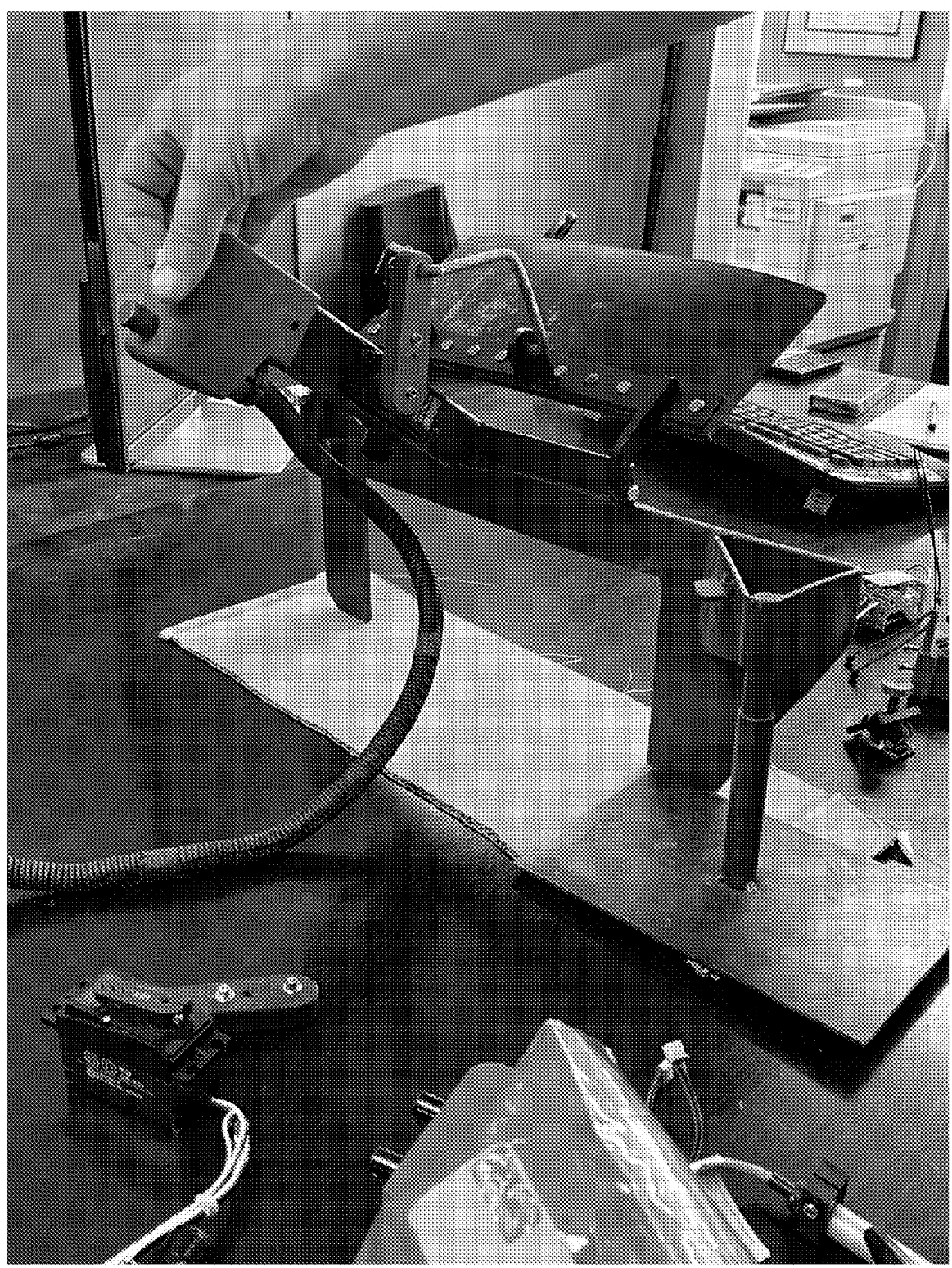
FIG. 2 is a pictorial view of an electronic processor-controlled variable-attitude discharge gate in accordance with the invention, mounted on a mock-up frame of a side outlet discharge opening for a mower deck, wherein this view further shows a mast in accordance with the invention comprising a rectangular steel tube that houses the electronics and provides a mounting stand for the drive gear, wherein the discharge gate is shown (relative to an imaginary clock face) in a 1:30 position ("attitude"), and wherein the vantage point is taken from the perspective of being inside the mower deck.

FIG. 2 shows an electronic processor-controlled variable-attitude discharge gate in accordance with the invention. A mast in accordance with the invention comprises a rectangular steel tube that houses the electronics and provides a mounting stand for the drive gear the movement of the discharge gate. The mast and discharge gate are mounted on a mock-up frame of a side outlet discharge opening for a mower deck. Here, the discharge gate is shown (relative to an imaginary clock face) in a 1:30 position, and wherein the vantage point is taken from the perspective of being inside the mower deck.

Figure 3:
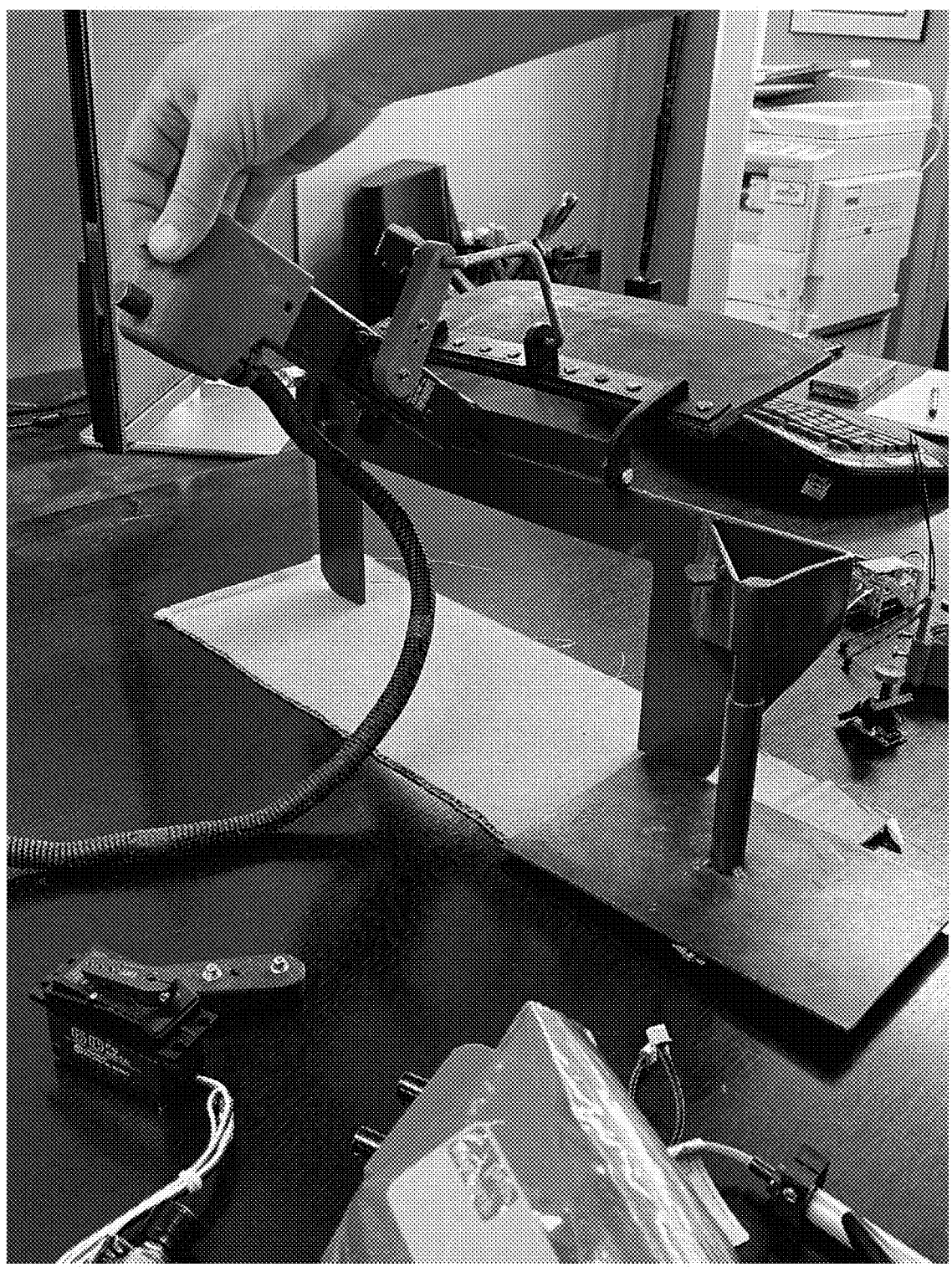
FIG. 3 shows the is comparable except the discharge gate is shown in a 2:30 position.
Figure 4:
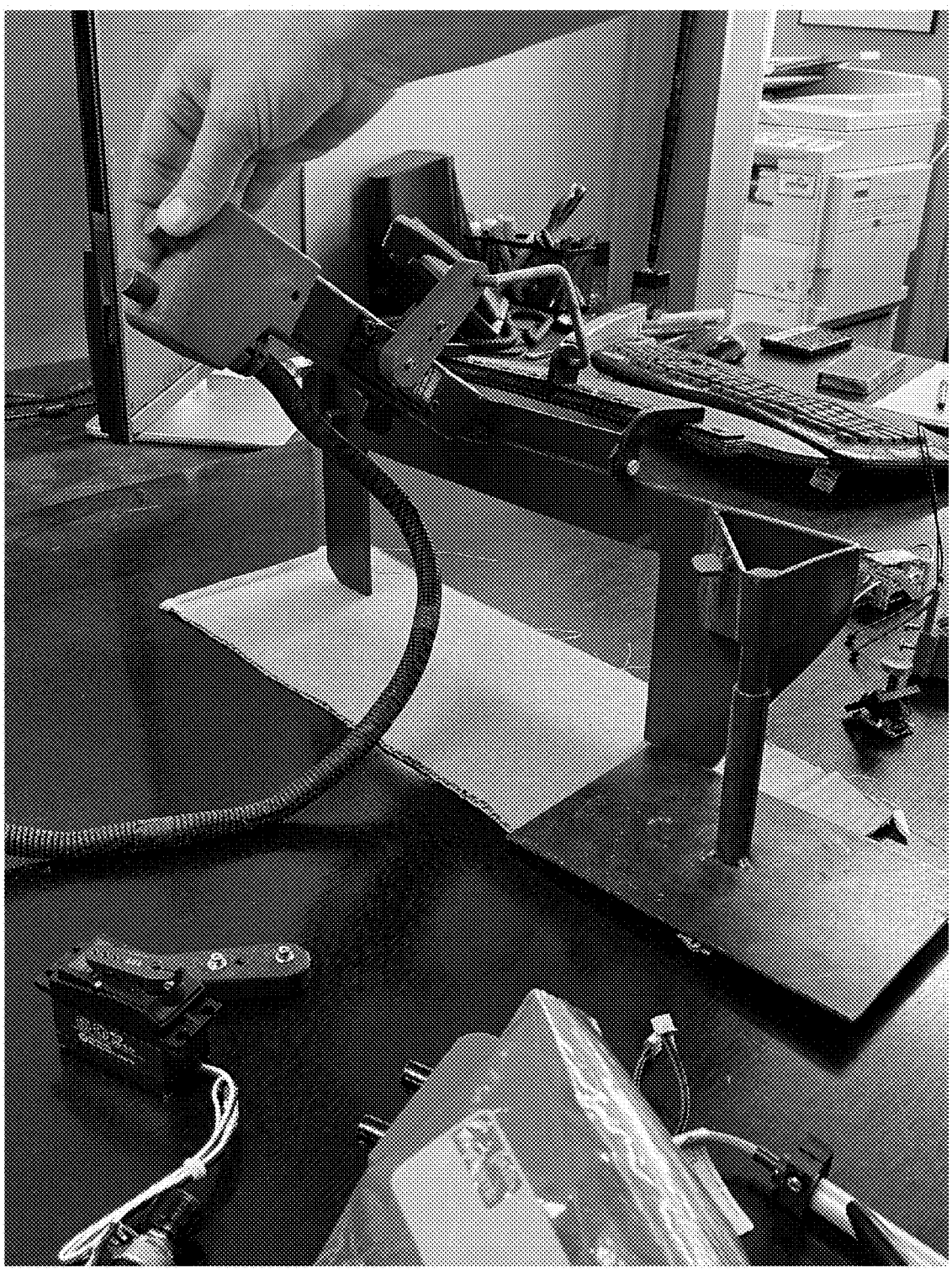
FIG. 4 is comparable except the discharge gate is shown in a four o'clock position.
Figure 5:
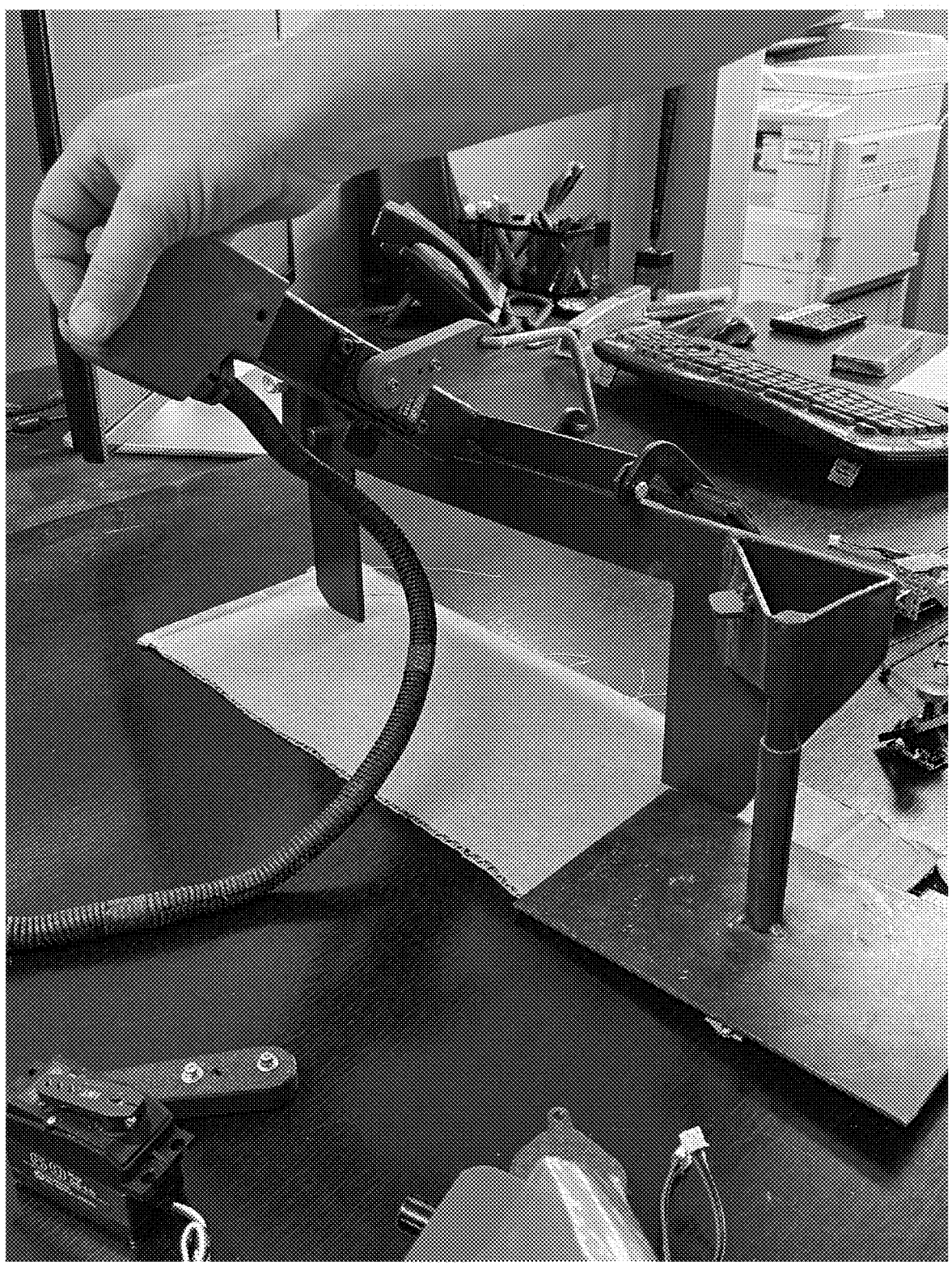
FIG. 5 is comparable except the discharge gate is shown in a five o'clock position.
Figure 6:
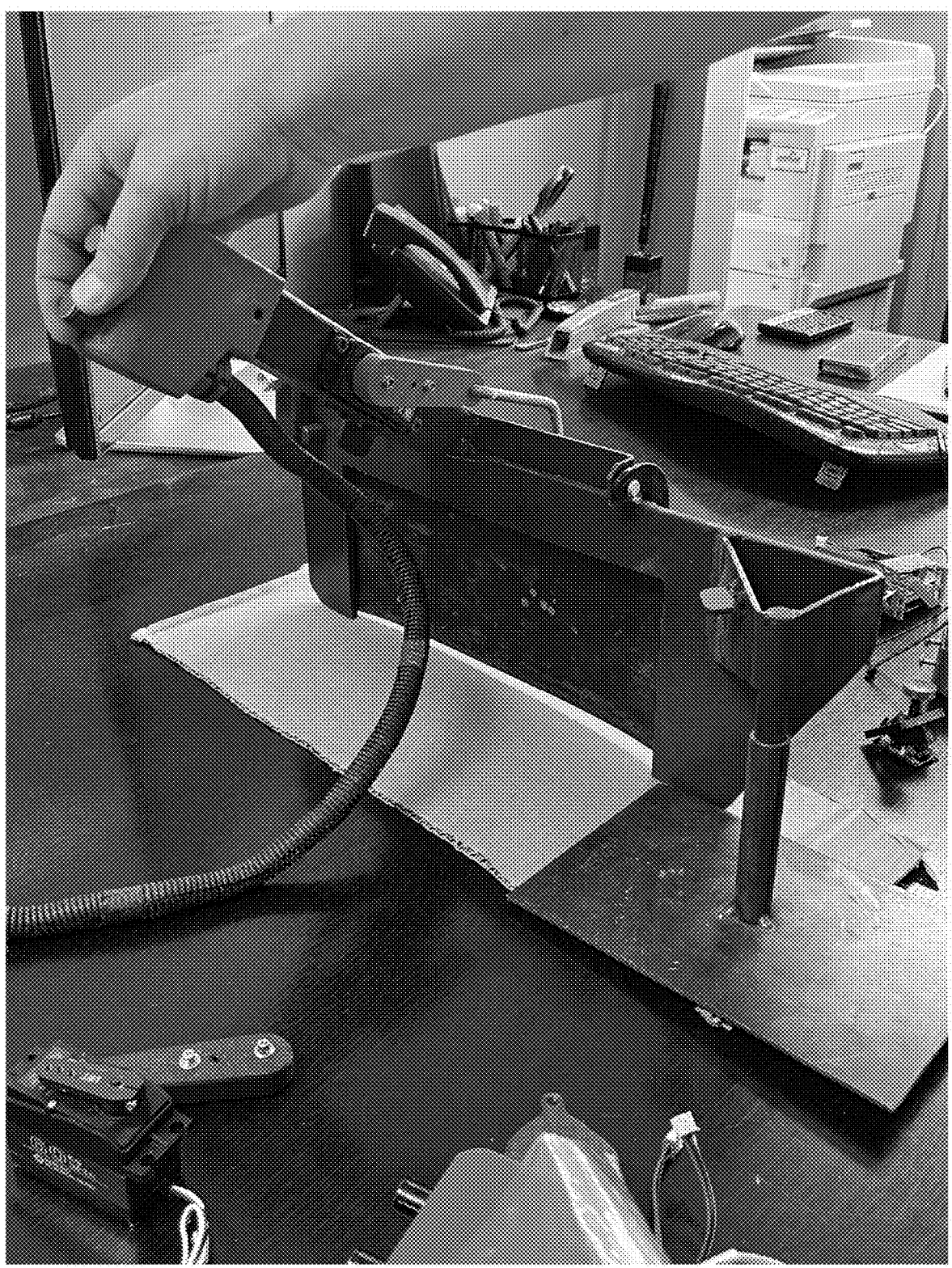
FIG. 6 is comparable except the discharge gate is shown in a six o'clock position (ie., straight down and side outlet is closed)

FIG. 3 is comparable except the discharge gate is shown in a 2:30 position. FIG. 4 is also comparable except the discharge gate is shown in a four o'clock position. In FIG. 5, the discharge gate is shown in a five o'clock position, and in FIG. 6 the discharge gate is shown in a six o'clock position (ie., straight down and side outlet is closed).

Figure 7:
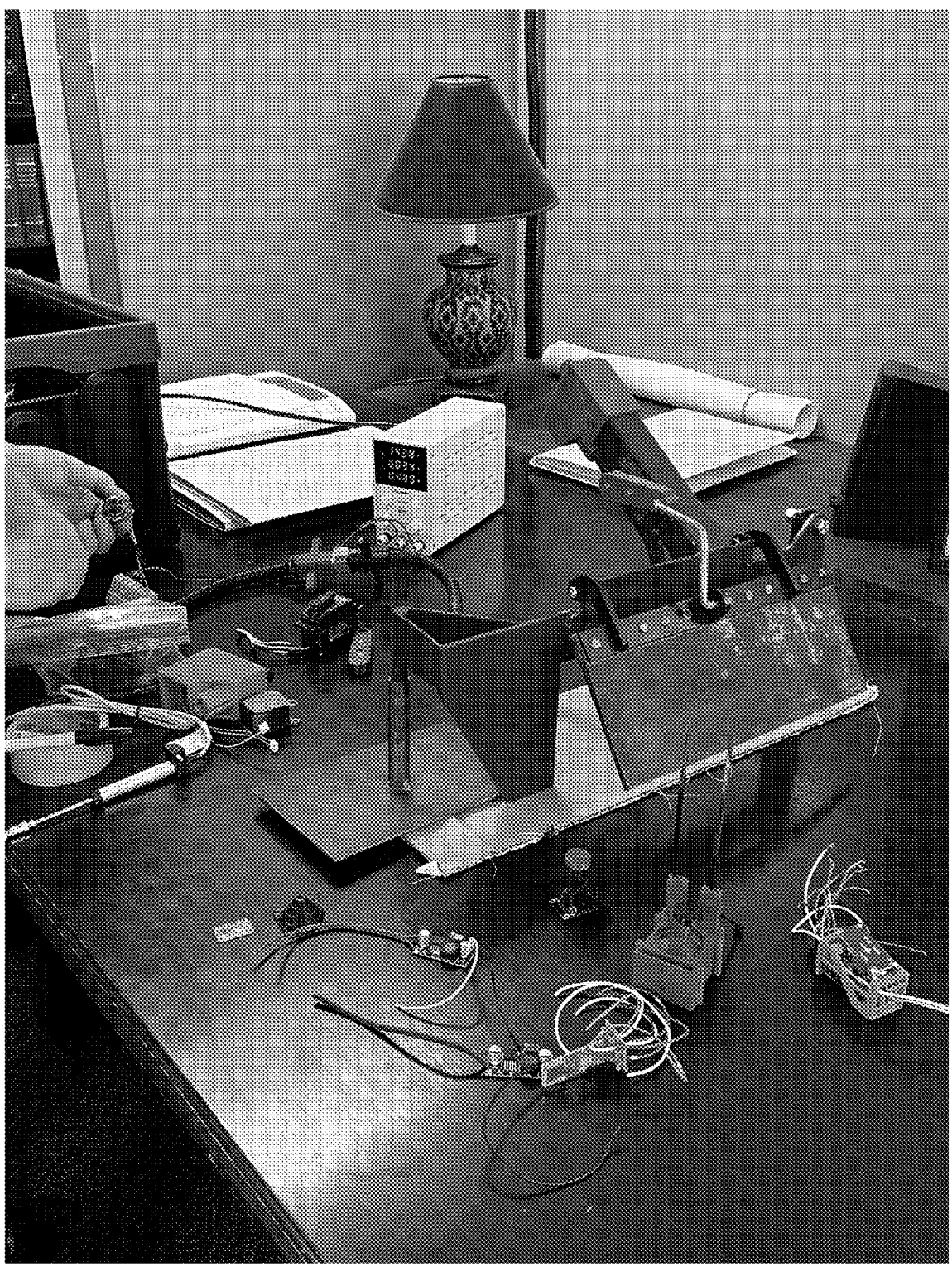
FIG. 7 is a pictorial view of the electronic processor-controlled variable-attitude discharge gate in accordance with the invention still mounted on the mock-up frame of the side outlet discharge opening of a mower deck, except the vantage point has been changed to being taken from the perspective of being outside the mower deck, wherein the discharge gate is shown in a 4:30 position.

FIG. 7 shows the electronic processor-controlled variable-attitude discharge gate in accordance with the invention still mounted on the mock-up frame of the side outlet discharge opening of a mower deck, except the vantage point has been changed around to being taken from the perspective of being outside the mower deck. Also, the discharge gate is shown in a 4:30 position.

Figure 8:
FIG. 8 is comparable except the discharge gate is shown in a three o'clock position.
Figure 9:
FIG. 9 is comparable except the discharge gate is shown in a twelve o'clock position (ie., straight up, and in a relatively safety position from being clipped off by mailbox posts or the like)

FIG. 8 is comparable except the discharge gate is shown in a three o'clock position. FIG. 9 shows the discharge gate is in a twelve o'clock position (ie., straight up, and in a relatively safety position from being clipped off by mailbox posts or the like).

Figure 10:
FIG. 10 is a side elevational pictorial view showing the 4-bar linkage nature of the drive arrangement, wherein:
  the ground frame is provided by the mock-up outlet frame and the mast comprising a rectangular steel tube that houses the electronics and provided a mounting stand for a servo motor (an example servo-motor shown in isolation and suspended over where the in-use servo-motor is mounted),
  the crank that is driven by the servo-motor,
  a coupler comprising an inverted-V shaped bent rod, and
  the driven link, which is indeed the discharge gate,
wherein the discharge gate is shown in a one o'clock position.

FIG. 10 is a side elevational pictorial view showing the 4-bar linkage nature of the drive arrangement.

That 4-bar linkage constituting the drive arrangement comprises without limitation the following links or structures:
  the ground frame is provided by the mock-up outlet frame and the mast comprising a rectangular steel tube that houses the electronics and provided a mounting stand for a servo motor (an example servo-motor shown in isolation and suspended over where the in-use servo-motor is mounted),
  the crank is driven by the servo-motor,
  a coupler comprising an inverted-V shaped bent rod, and
  the driven link, which is indeed the discharge gate.
Also, the discharge gate is shown in a one o'clock position.

Figure 11:
FIG. 11 is a side elevational pictorial view from the opposite side thereof, wherein the discharge gate is shown in the six o'clock position (ie., straight down) and thereby showing the reason for the inverted-V bend in the coupler link, that is, to reach around the top of the frame of the side outlet in the mower deck.

FIG. 11 is a side elevational pictorial view from the opposite side thereof, wherein the discharge gate is shown in the six o'clock position (ie., straight down) and thereby showing the reason for the inverted-V bend in the coupler link, that is, to reach around the top of the frame of the side outlet in the mower deck.

Figure 12:
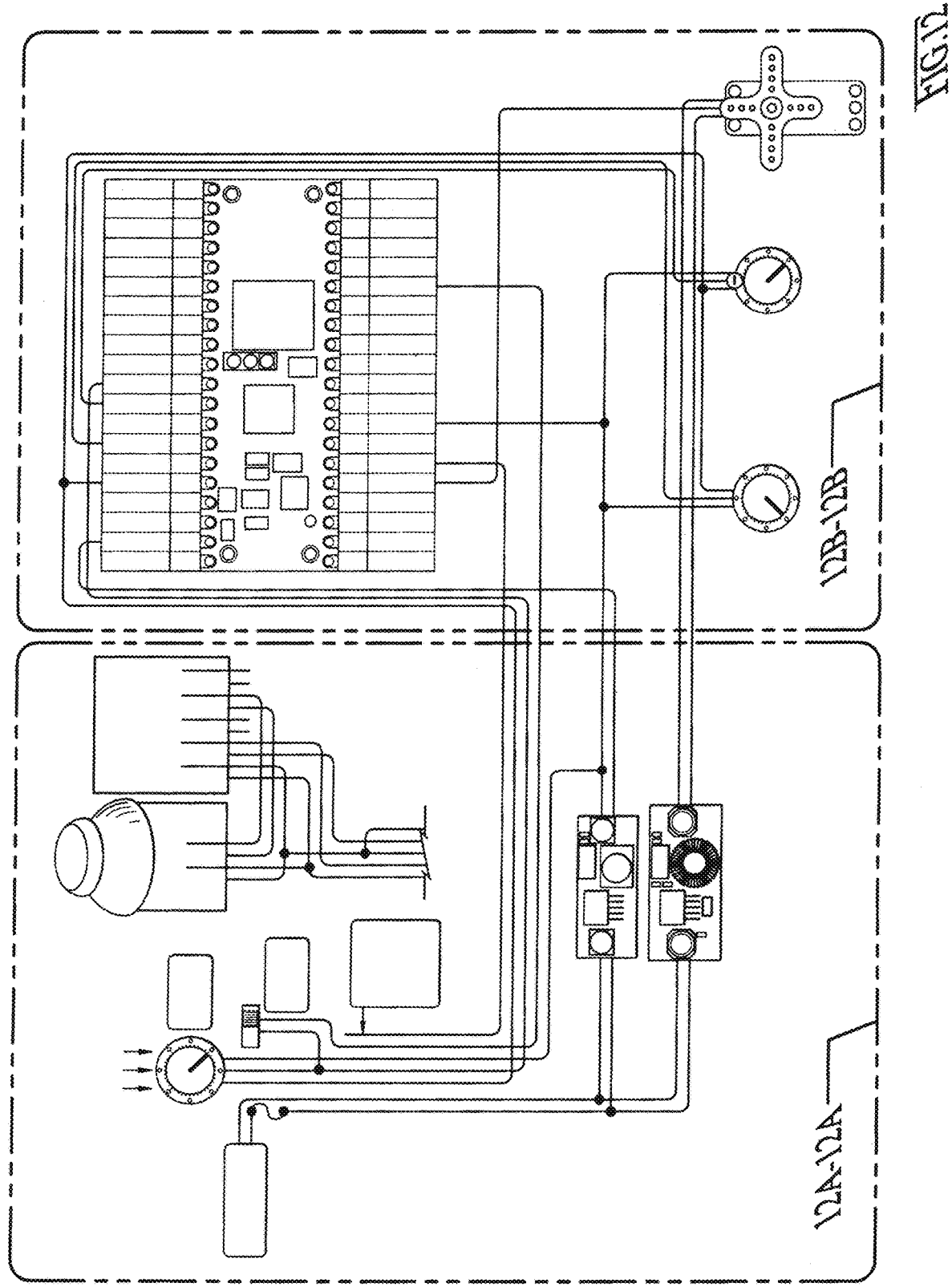
FIG. 12 is an electric schematic/wiring diagram of the control electronics in accordance with the invention.
Figure 12A:
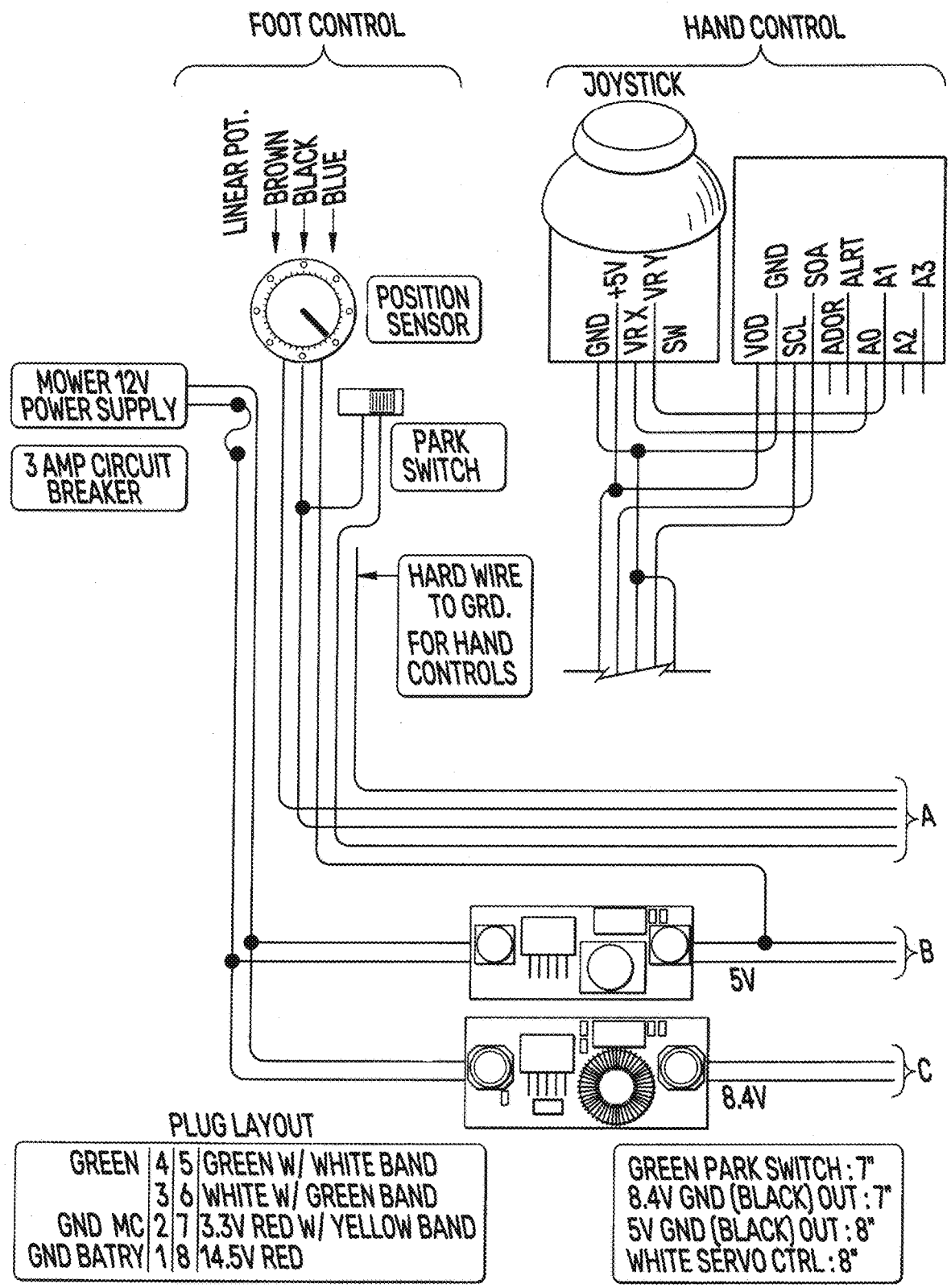
FIG. 12A is an enlarged view of the left half of FIG. 12, wherein enlarged for clarity.
Figure 12B:
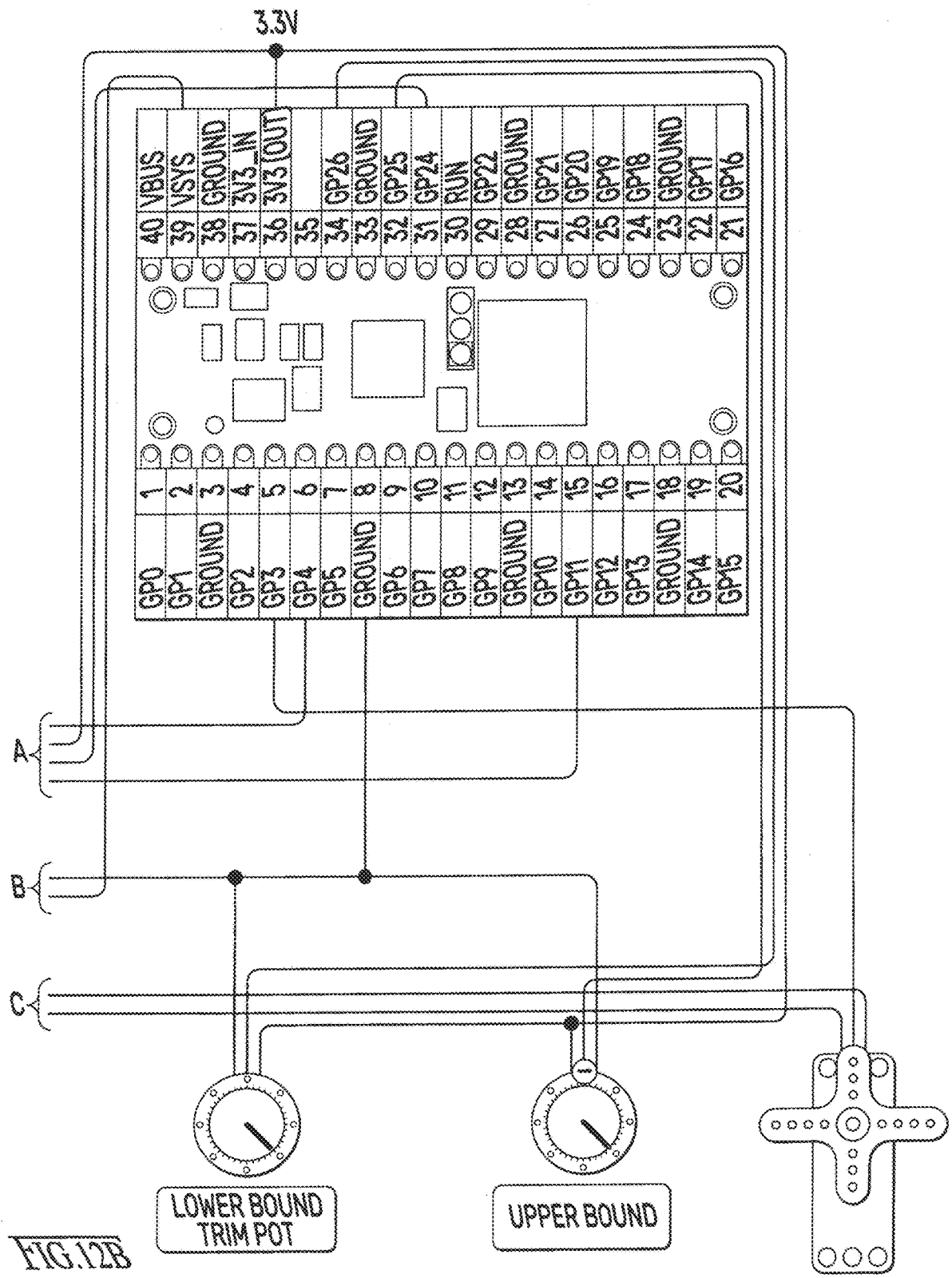
FIG. 12B is an enlarged view of the right half of FIG. 12, likewise enlarged for clarity.

FIG. 12 is an electric schematic/wiring diagram of the control electronics in accordance with the invention. FIG. 12A is an enlarged view of the left half of FIG. 12, wherein enlarged for clarity, and FIG. 12B is an enlarged view of the right half of FIG. 12, likewise enlarged for clarity.

Figure 13:
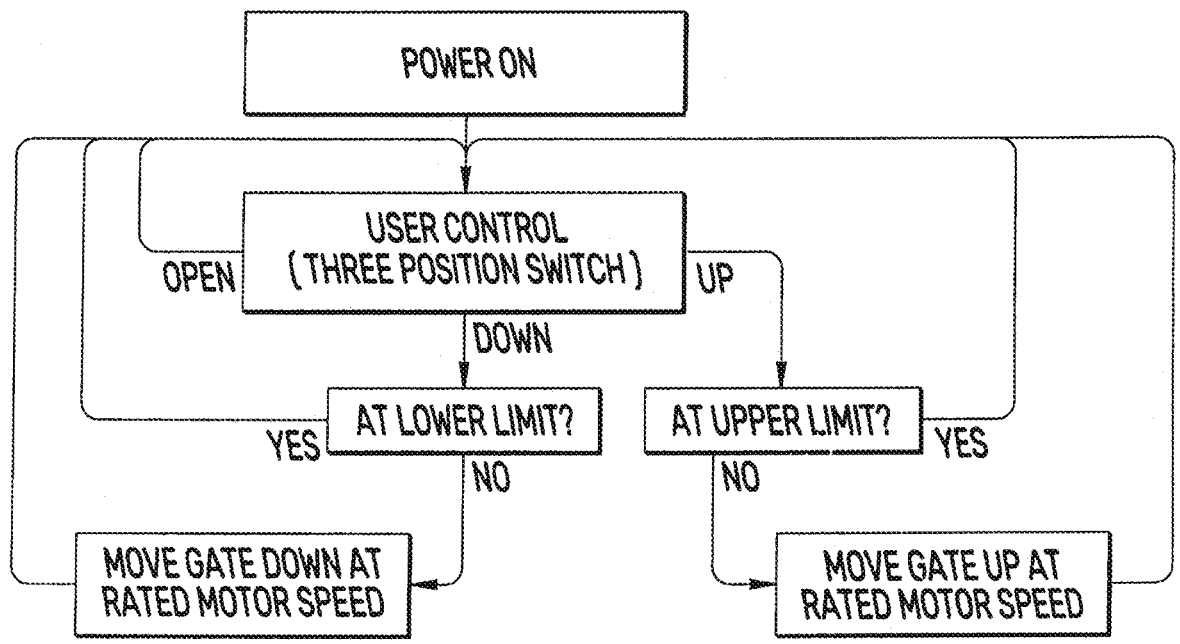
FIG. 13 is a block diagram showing in part the user interface with the electronics in accordance with the invention.
Figure 14:
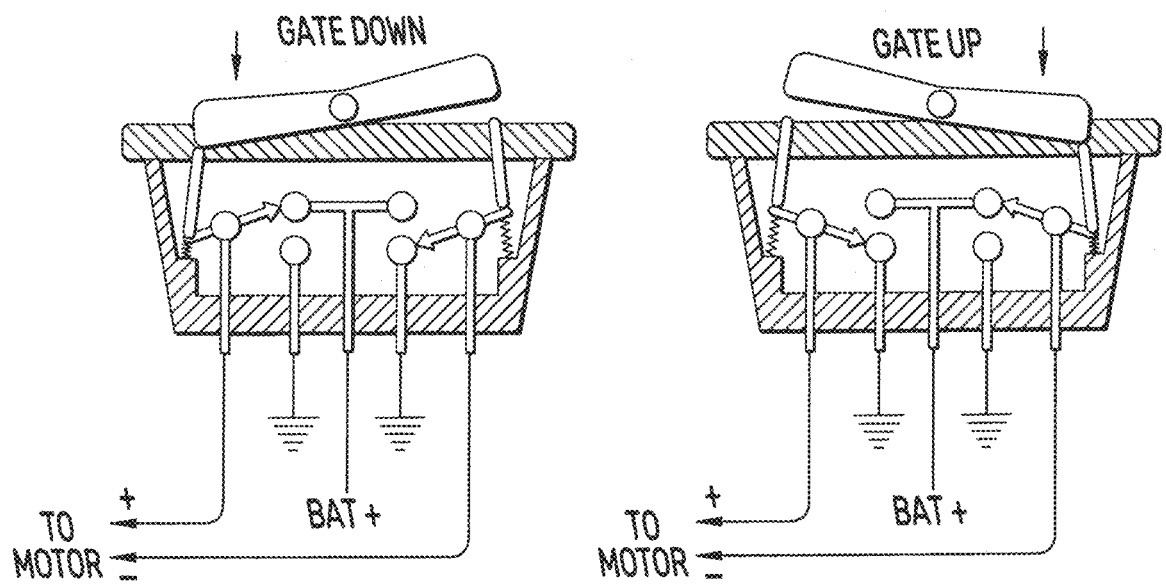
FIG. 14 is a block diagram representation of the UP-DOWN gate-drive switch in accordance with the invention.

FIG. 13 is a block diagram showing in part a user interface for the electronics in accordance with the invention. FIG. 14 is a block diagram representation of the UP-DOWN gate-drive switch in accordance with the invention.

Figure 15:
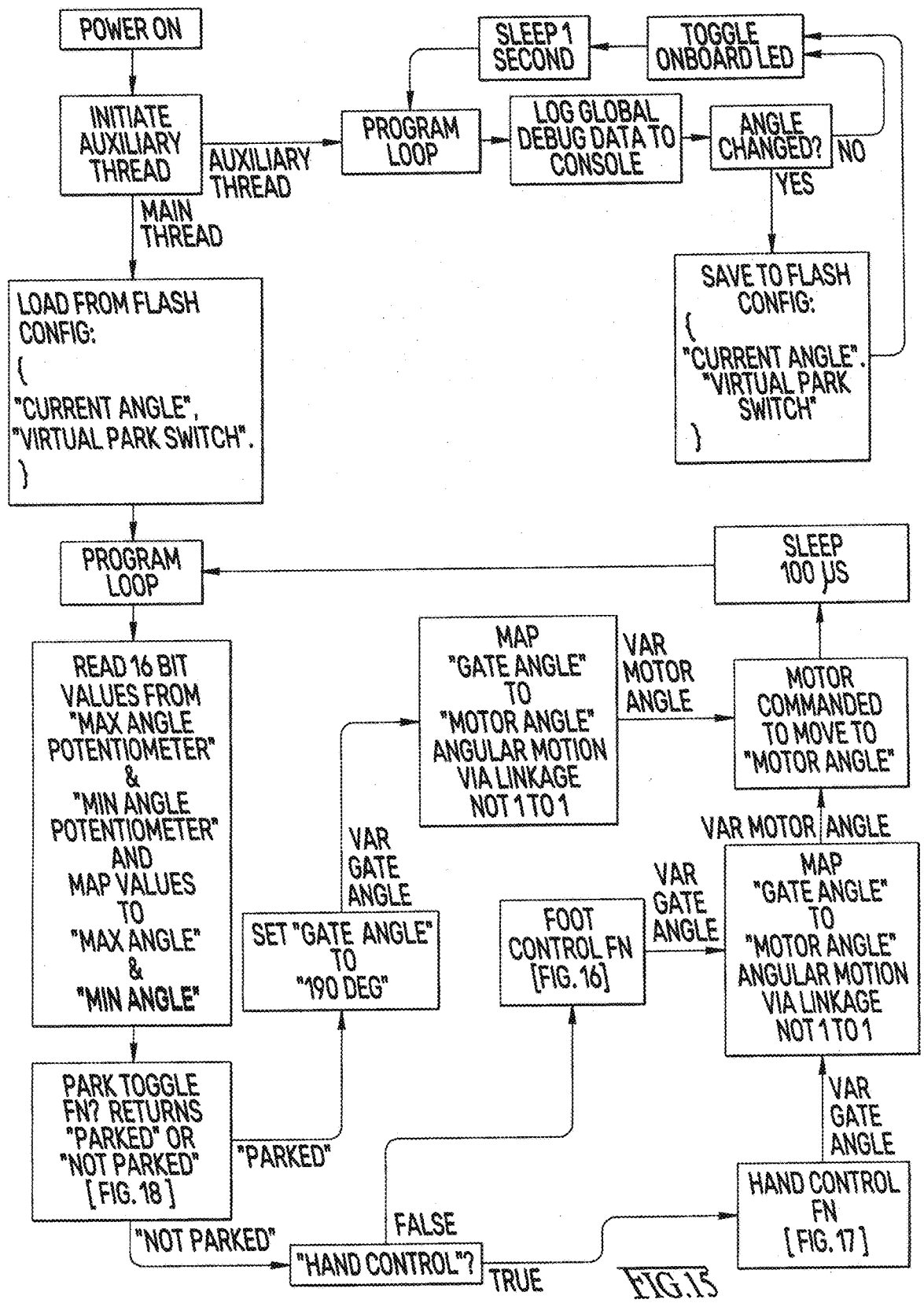
FIG. 15 is a block diagram of the programming/algorithm for the control procedure in accordance with the invention.
Figure 16:
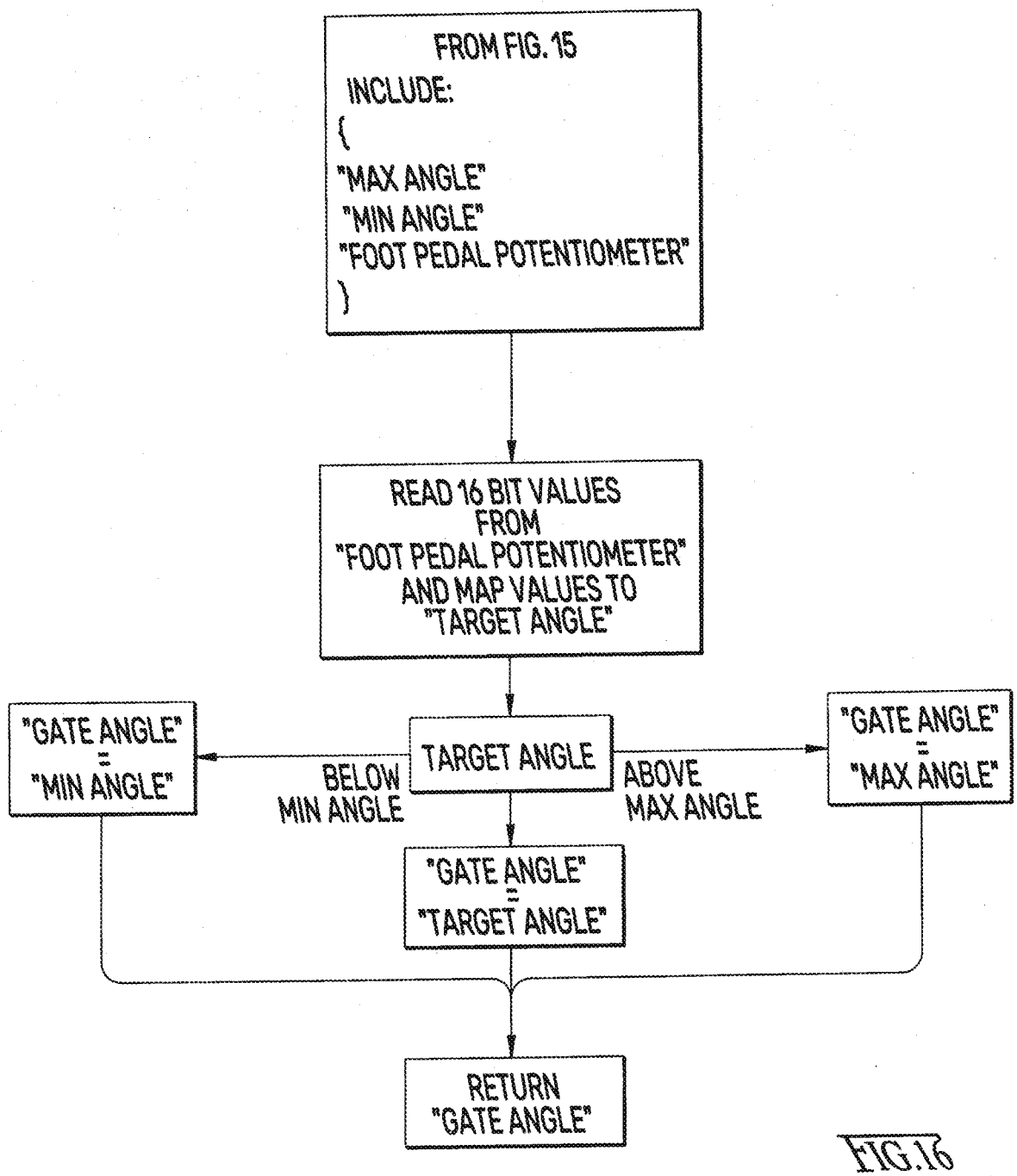
FIG. 16 is a block diagram of the programming/algorithm for the control procedure in accordance with the invention, being a continuation of the block that calls FIG. 16 in FIG. 15.
Figure 17:
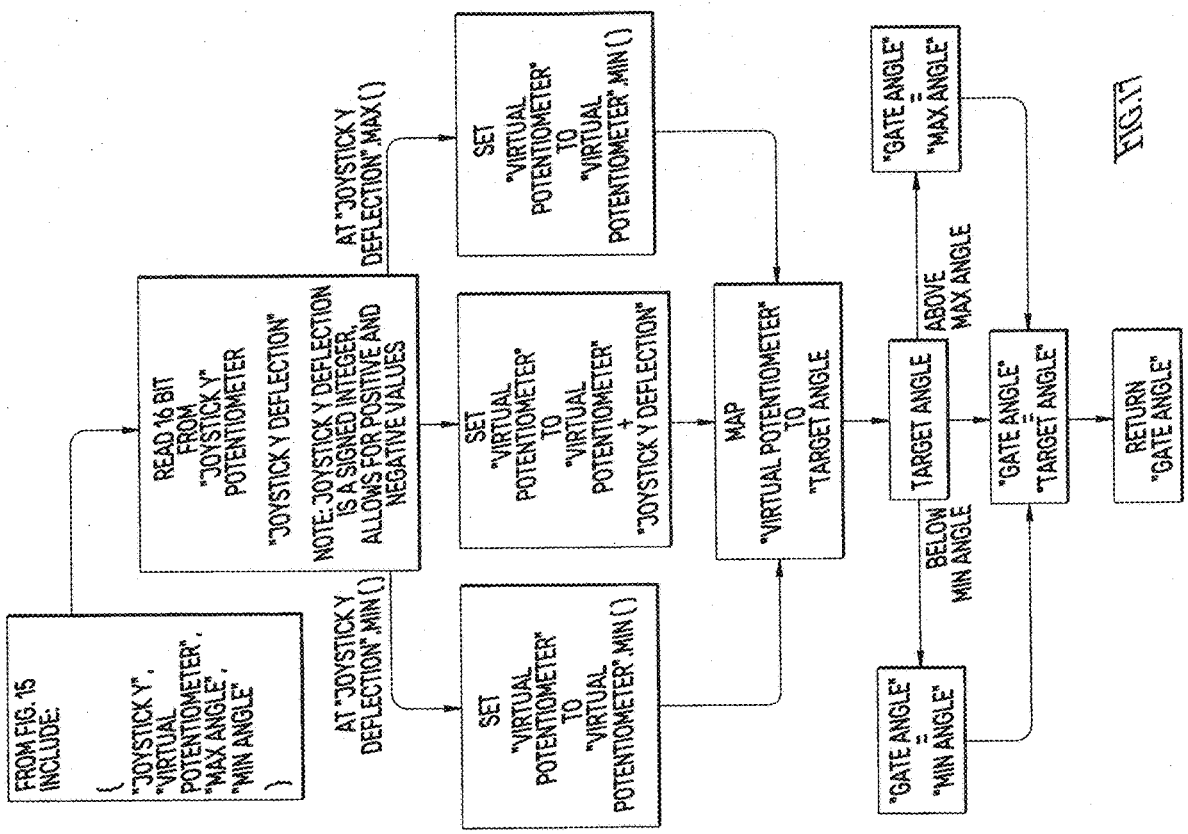
FIG. 17 is a block diagram of the programming/algorithm for the control procedure in accordance with the invention, being a continuation of the block that calls FIG. 17 in FIG. 15.
Figure 18:
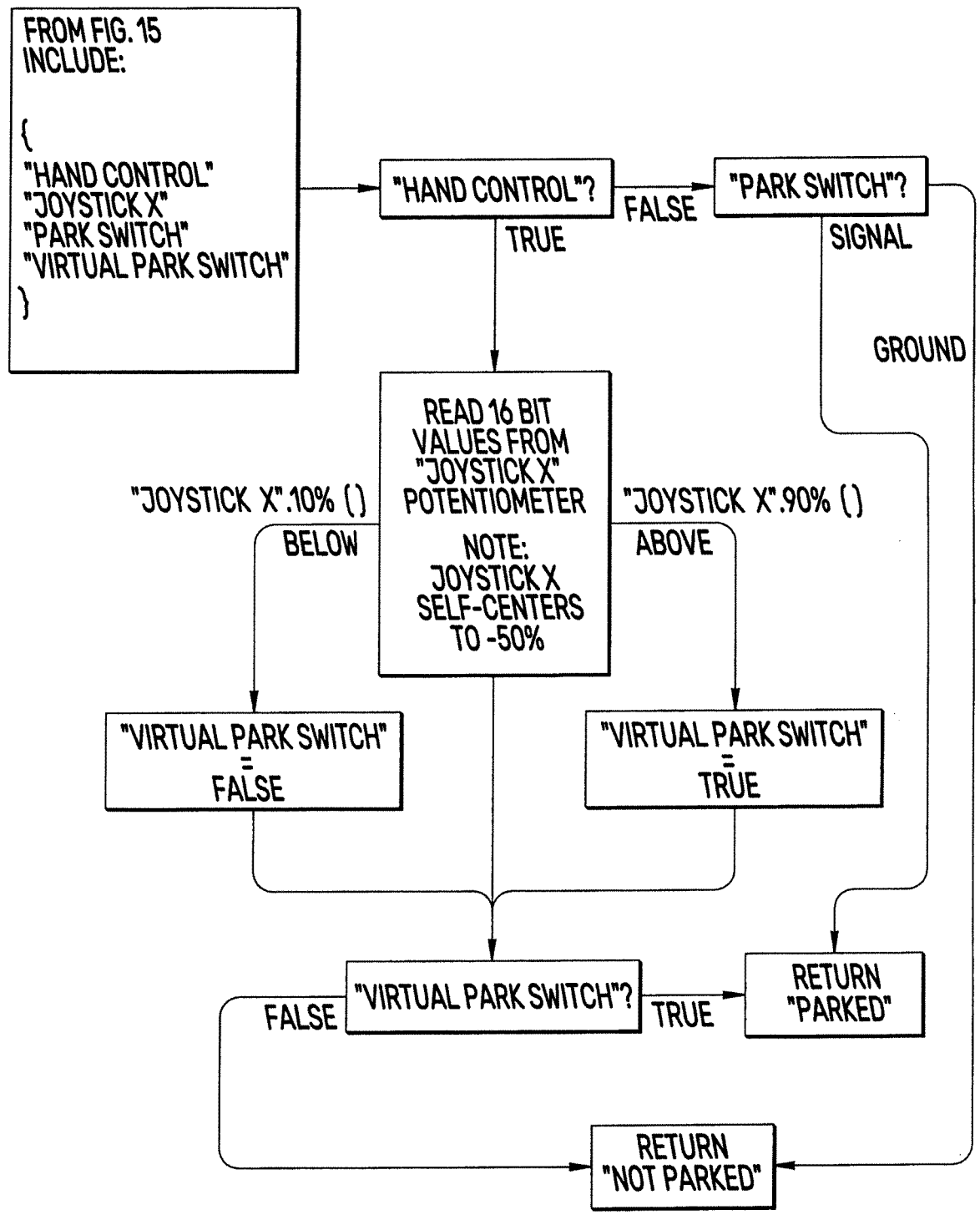
FIG. 18 is a block diagram of the programming/algorithm for the control procedure in accordance with the invention, being a continuation of the block that calls FIG. 18 in FIG. 15.

FIG. 15 is a block diagram of the programming/algorithm for the control procedure in accordance with the invention, comprising a block diagram of a main routine. FIG. 16 is a block diagram of the programming/algorithm for the control procedure in accordance with the invention, being a continuation of the block that calls FIG. 16 in FIG. 15, and comprising a foot control function. FIG. 17 is a block diagram of the programming/algorithm for the control procedure in accordance with the invention, being a continuation of the block that calls FIG. 17 in FIG. 15, and comprising a hand control function. FIG. 18 is a block diagram of the programming/algorithm for the control procedure in accordance with the invention, being a continuation of the block that calls FIG. 18 in FIG. 15, and comprising "park" toggle function.

In FIG. 15, the two program loops are infinite loops until the device powers OFF.

In FIG. 16, the foot pedal has a long physical range between its minimum and maximum travel. This maps quite nicely to the range of the Gate position. Pressing the top portion of the pedal moves gate going up proportionally, pressing the bottom portion of the pedal moves the gate down proportionally, the friction holds the pedal in place. The Foot Control also has a simple on-off switch to put the gate into the parked position.

In FIG. 17, the Hand Control requires a different paradigm, due to the self centering two-axis thumb joystick. Since both Axes of the joystick self center, it is not possible to map the motion of the joystick to the gate directly. Thus, this simulates "pushing" a virtual potentiometer up and down its range via the joystick movement.

In FIG. 18, the second axis of the joystick is used to create a "Virtual Park Switch", which is either set to TRUE or FALSE.

Figure 19:
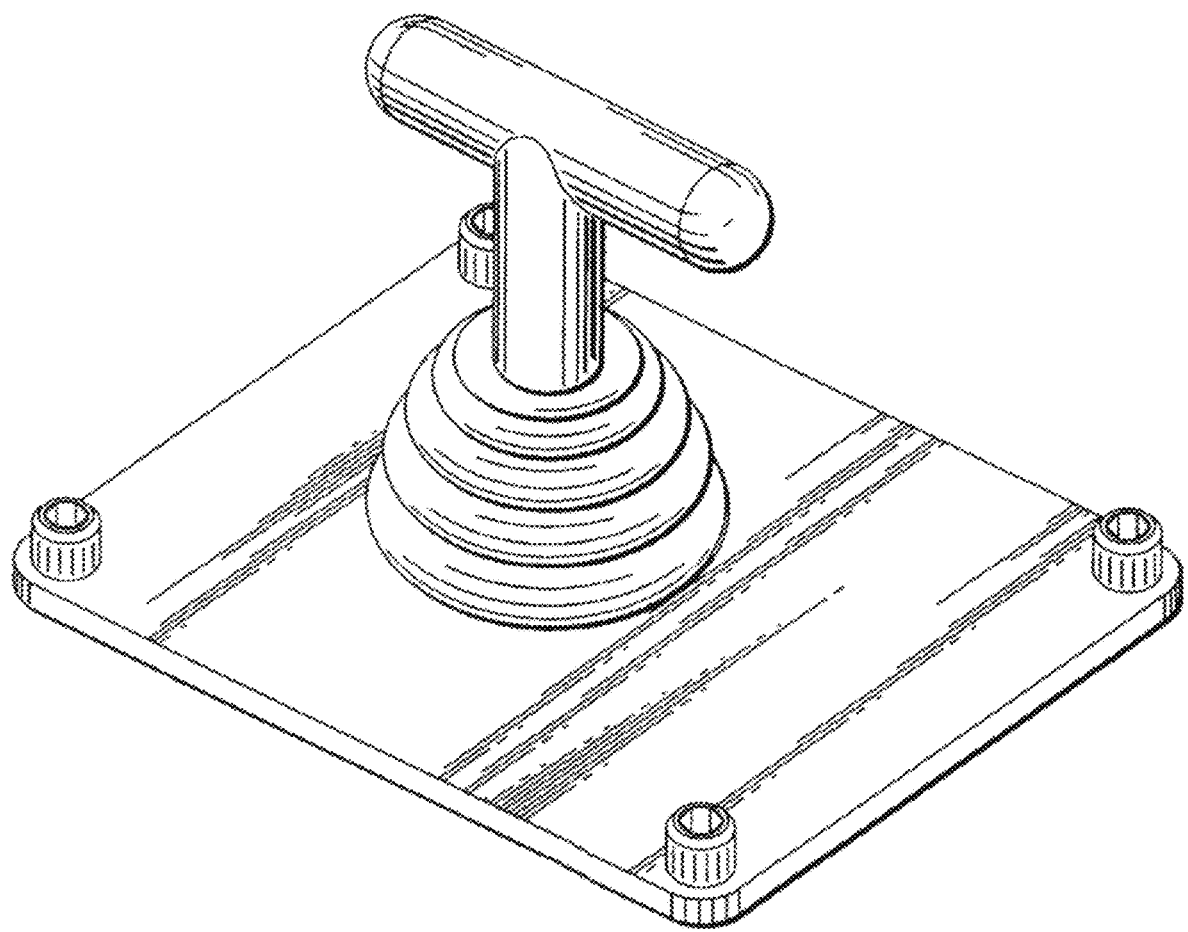
FIG. 19 is a perspective view of an example user interface.

FIG. 19 is a perspective view of an example user interface, for example and without limitation a joy stick. Other non-exclusive examples could include without limitation a foot pedal that pushes and pulls a linear potentiometer.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An apparatus comprising:
   a mower comprising a discharge outlet for discharging mown material;
   a mounting mast attached to the mower;
   a motor attached to the mounting mast and comprising a rotating output shaft;
   a crank rotationally attached to the mounting mast and rotationally coupled to the rotating output shaft;
   a discharge gate attached to the crank by means of a 4-bar linkage system and positionable via rotation of the rotating output shaft so as to at least partially block the discharge outlet;
   a processor programmed or configured to operate the motor to rotate the rotating output shaft and brake the rotation anywhere between extremes of the discharge outlet being fully OPEN and the discharge outlet fully CLOSED; and
   a user interface in electrical communication with the processor.

2. The apparatus of claim 1, further comprising weldments attaching the mounting mast to the mower.

3. The apparatus of claim 1, wherein the mounting mast comprises a rectangular steel tube and houses the processor.

4. The apparatus of claim 3, wherein the crank is based on the mounting mast.

5. The apparatus of claim 1, wherein the motor comprises a servo motor.

6. The apparatus of claim 1, wherein the servo motor is based on the mounting mast.

7. The apparatus of claim 1, wherein the 4-bar linkage system comprises a coupler line, and the discharge gate is attached to the coupler link.

8. The apparatus of claim 1, wherein;
   the rotating output shaft rotates between extremes of about 180° (one-hundred and eighty degrees) apart.

9. The apparatus of claim 8, wherein:
   the discharge gate rotates between extremes, relative to an imaginary clock dial, between six o'clock (straight down, or an outlet CLOSED position) and twelve o'clock (straight up, or a safety position).

10. The apparatus of claim 1, wherein:
    the mower comprises a battery; and
    the user interface is electrically connected to the battery.

11. The apparatus of claim 1, wherein the user interface comprises an UP-DOWN switch.

12. The apparatus of claim 1, wherein the user interface comprises a joy stick.

13. The apparatus of claim 1, wherein the user interface comprises a foot pedal.

14. The apparatus of claim 1, wherein the user interface includes a "Park" switch.

15. The apparatus of claim 1, wherein the user interface includes a "Park" function.

* * * * *